(12) United States Patent
Wuerfel

(10) Patent No.: US 6,644,267 B2
(45) Date of Patent: Nov. 11, 2003

(54) FUEL INJECTION SYSTEM

(75) Inventor: Gernot Wuerfel, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/031,971

(22) PCT Filed: May 19, 2001

(86) PCT No.: PCT/DE01/01913

§ 371 (c)(1),
(2), (4) Date: Jun. 19, 2002

(87) PCT Pub. No.: WO01/90571

PCT Pub. Date: Nov. 29, 2001

(65) Prior Publication Data
US 2002/0179039 A1 Dec. 5, 2002

(51) Int. Cl.⁷ ............................ F02M 61/18; F02B 3/02
(52) U.S. Cl. .................... 123/298; 123/305; 239/533.12
(58) Field of Search ................. 123/295, 298, 123/305, 276, 279; 239/533.12

(56) References Cited

U.S. PATENT DOCUMENTS

| | | | |
|---|---|---|---|
| 5,058,549 A | * | 10/1991 | Hashimoto et al. ......... 123/298 |
| 5,775,289 A | | 7/1998 | Yoshida et al. ............. 123/305 |
| 6,045,063 A | | 4/2000 | Koike et al. ............. 239/533.3 |

FOREIGN PATENT DOCUMENTS

| DE | 196 42 653 | 1/1998 |
|---|---|---|
| DE | 38 08 635 | 6/1998 |
| DE | 198 04 463 | 8/1999 |
| JP | 11 050 848 | 2/1999 |

* cited by examiner

Primary Examiner—Tony M. Argenbright
(74) Attorney, Agent, or Firm—Kenyon & Kenyon

(57) ABSTRACT

A fuel injection system for internal combustion engines has at least one fuel injector which injects fuel into a combustion chamber with a spark plug projecting into the combustion chamber. The fuel injector has a valve body which has a plurality of injection holes situated on the circumference. The injection holes are designed so that a conical spray jet is produced in the combustion chamber. At least the injection holes situated directly on both sides of the spark plug have an elongated cross section.

9 Claims, 2 Drawing Sheets ered swirl flow of the injection jet. The total cross-sectional area of the swirl grooves is smaller by at least one half than the cross-sectional area of the outlet opening, the fuel injector being situated above the flushing opening, and with its jet axis directed at the ignition point situated at the center of the cylinder head.

FUEL INJECTION SYSTEM

FIELD OF THE INVENTION

The present invention relates to a fuel injection system.

BACKGROUND INFORMATION

In internal combustion engines having spark ignition of a compressed fuel mixture with internal formation of the mixture, a "mixture cloud" which must have a certain fuel-air ratio in the ignitable range is required for stratified charge operation in the spark plug area. To this end, fuel injectors having nozzles which open toward the inside or the outside and produce a conical jet are used.

For example, German Published Patent Application No. 198 04 463 describes a fuel injection system for internal combustion engines having spark ignition of a compressed fuel mixture, this fuel injection system is provided with at least one fuel injector which injects fuel into a combustion chamber formed by a piston/cylinder arrangement and is equipped with a spark plug projecting into the combustion chamber. The nozzle body of the fuel injector is provided with at least one row of injection holes distributed over the circumference of a nozzle body of the fuel injector. Through controlled injection of fuel through the injection holes, a jet-guided combustion method is implemented by the formation of a mixture cloud, at least one jet being directed in the direction of the spark plug. Other jets ensure that an at least approximately closed or coherent mixture cloud is formed.

German Patent No. 196 42 653 describes a method of forming an ignitable fuel-air mixture. An ignitable fuel-air mixture is formable in the cylinders of direct-injection internal combustion engines, in that fuel is injected into each combustion chamber delimited by a piston, by way of an injector on opening of a nozzle orifice due to a valve element being lifted up from a valve seat surrounding the nozzle orifice. To permit formation of a mixture optimized for fuel consumption and emissions in each operating point of the entire engine characteristics map under all operating conditions of the internal combustion engine, in particular in stratified charge operation, the opening stroke of the valve element and the injection time are adjustable.

German Patent No. 38 08 635 describes a fuel injection device for direct injection of fuel into the cylinder of an internal combustion engine having compression of a fuel mixture. The fuel injection device includes a fuel injector which is situated in the cylinder wall at a distance from the cylinder head and opposite the exhaust opening and which has an outlet opening, with the axis of the jet of the injection valve being directed at the area around the spark plug situated in the cylinder head. The fuel injector here has a magnetically operated valve needle having helical swirl grooves to produce a swirl flow of the injection jet. The total cross-sectional area of the swirl grooves is smaller by at least one half than the cross-sectional area of the outlet opening, the fuel injector being situated above the flushing opening, and with its jet axis directed at the ignition point situated at the center of the cylinder head.

Most injection systems known from the publications cited above concern combustion methods with wall-guided or air-guided fuel flow. The air-guided combustion method depends to a very great extent on the movement of incoming air, which has the function of conveying an ignitable fuel-air mixture exactly into the electrode area of the spark plug over the entire stratified charge operation range of the engine characteristics map. In the wall-guided combustion method, fuel is carried to the spark plug with the support of more or less fractured combustion chamber geometries with simultaneous formation of the mixture.

Transport of the mixture to the spark plug is very incomplete in wall-guided and air-guided combustion methods in idling operation and in the lower partial load range, and in the middle partial load range of operation it is possible in part only with unjustifiably low manufacturing tolerances of the high-pressure injectors used or the flow guidance through the intake manifold. The inadequate reproducibility is apparent in particular in increased emission of unburned hydrocarbons due to isolated instances of misfiring. These properties result in another serious disadvantage of the two combustion methods mentioned above: the engine cannot be operated unthrottled in the idling and lower partial load ranges because due to the great distance between the fuel injector and the spark plug, smaller injection quantities no longer reach the spark plug in the mixture concentration required for stable combustion. This means that the fuel-air mixture at the spark plug electrodes becomes too lean. However, due to the intake air throttling, the advantage in terms of fuel consumption is reduced in comparison with internal combustion engines having compression of a mixture with spark ignition and intake manifold injection.

SUMMARY OF THE INVENTION

The fuel injection system according to the present invention has the advantage over the related art that the mixture in the area of the spark plug is not too rich and not too lean due to the design of the injection holes of the fuel injector there, but instead lean bridges are almost entirely prevented due to an approximately closed conical jet shape. The measure according to the present invention supports the development of a stable flame core.

It is also advantageous that the spark plug becomes less sooty, the thermal shock load is reduced, and the lack of sensitivity to the firing angle is improved with a fixed injection time in the entire engine characteristics map in which stratified charge operation is carried out. Injection and ignition may thus take place simultaneously.

The design of elongated injection holes has the advantage that the flow losses during the flow through the injection holes are reduced, so the operating pressure may be lowered.

Various arrangements of the injection holes and different angles of inclination relative to one another may be selected, depending on the requirements of the fuel injection system.

The elongated design of the injection holes enclosing the spark plug is also especially advantageous because the spark plug or the spark plug electrodes can be mounted at a variable mounting depth within a certain tolerance, which is predetermined by the length of the injection holes.

DETAILED DESCRIPTION

Figure 1:
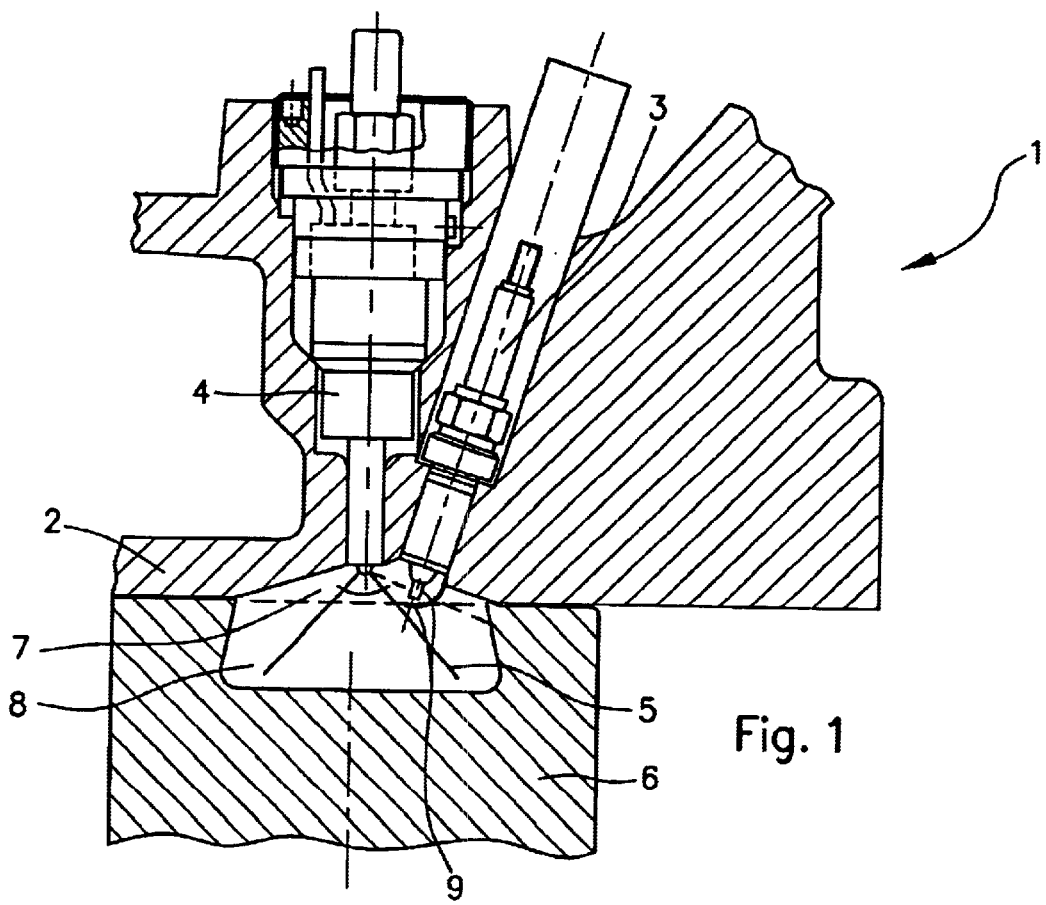
FIG. 1 shows a schematic section through an embodiment of a fuel injection system according to the present invention including a fuel injector.

FIG. 1 shows a detail of a schematic sectional diagram of a longitudinal section through an internal combustion engine 1 having compression of a fuel mixture. Internal combustion engine 1 has a cylinder head 2 in which are situated a spark plug 3 and a fuel injector 4 in suitably designed recesses. Since the design of both spark plug 3 and fuel injector 4 are known in principle, further description of these parts is unnecessary.

Fuel injector 4 injects fuel in a conical injection jet 5 into a combustion chamber 7 delimited by cylinder head 2, a piston 6 and a cylinder wall (not shown). Combustion chamber 7 is formed in part by a combustion chamber depression 8 formed in piston 6.

Fuel injector 4 and spark plug 3 are situated relative to one another so that spark plug 3 projects into combustion chamber 7 at a lateral offset from fuel injector 4, spark plug electrodes 9 being situated in the area of injection jet 5.

The shape of injection jet 5 depend on the design of the spray end of fuel injector 4. For example, fuel injector 4 is designed as an inwardly opening (I-valve) fuel injector 4. Fuel is injected into combustion chamber 7 by energizing an electromagnetic or piezoelectric actuator, causing a valve needle (not shown) or a valve closing body connected to it to lift up from a valve body equipped with injection holes. In this way, fuel is injected into combustion chamber 7 through fuel injector 4 and the injection holes in the valve body.

Embodiments of the injection holes in the valve body according to the present invention are illustrated in FIGS. 2–5 and explained in greater detail below.

FIGS. 2–5 each show on the left side a valve body 10 having injection holes 11 and on the right side of the respective figures, a developed view of injection holes 11 situated on the circumference of valve body 10.

FIG. 2 shows two embodiments of the arrangement of injection holes 11, with injection holes 11 being arranged in two rows 12a, 12b of injection holes 11 or with injection holes 11 displaced out of row 12a. The other rows each have only two individual injection holes 11 which are offset out of row 12a with respect to the spray direction. Both rows 12a, 12b in FIG. 2A have an axial spacing from one another. On the side of valve body 10 facing spark plug 3, first row 12a has a spark plug gap 13, one injection hole 11a being omitted. Instead of injection hole 11a in first row 12a, two other injection holes 11b are provided in second row 12b to guarantee the homogeneity of injection jet 5 or the mixture cloud thus formed in combustion chamber 7.

Figures 1, 2A:
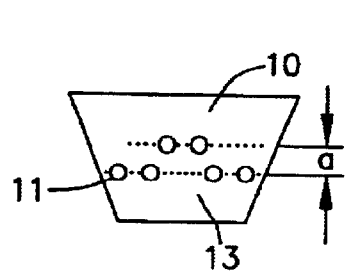
FIG. 2A is a first illustration of a first group of embodiments of the design of the valve body of the fuel injector according to the present invention.
Figure 2A:
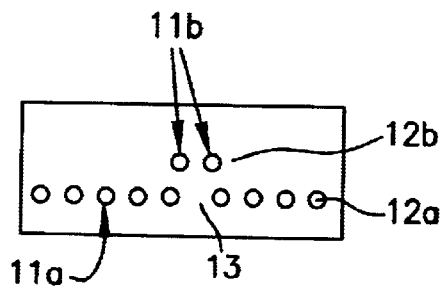
Figures 1, 2B:
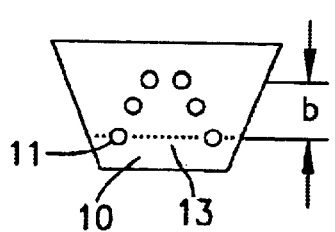
FIG. 2B is a second illustration of a first group of embodiments of the design of the valve body of the fuel injector according to the present invention.
Figure 2B:
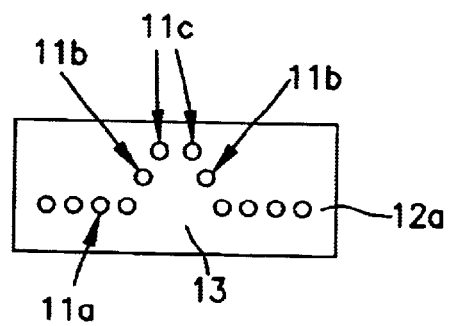

To achieve further homogenization of injection jet 5, injection holes 11 may also be arranged with a displacement as illustrated in FIG. 2B, so that injection holes 11c having the greatest displacement are located at a distance b from row 12a. Spark plug gap 13 may be enlarged somewhat in this way without impairing the homogeneity of the mixture cloud in combustion chamber 7.

Distances a and b between displaced injection holes 11 may be adapted to the respective requirements in a variable manner.

Figures 1, 3A:
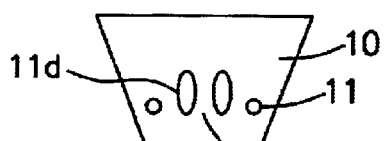
FIG. 3A is a first illustration of a second group of embodiments of the design of the valve body of the fuel injector according to the present invention.
Figure 3A:
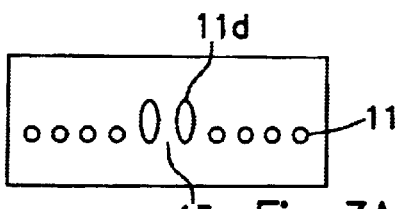
Figures 1, 3B:
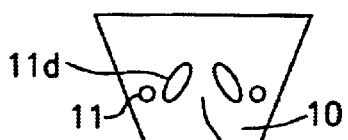
FIG. 3B is a second illustration of a second group of embodiments of the design of the valve body of the fuel injector according to the present invention.
Figure 3B:
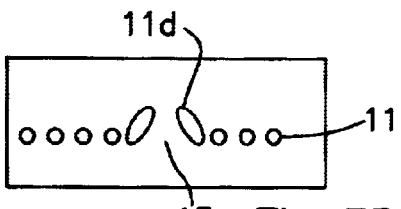
Figures 1, 3C:
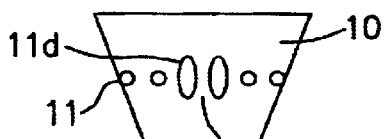
FIG. 3C is a third illustration of a second group of embodiments of the design of the valve body of the fuel injector according to the present invention.
Figure 3C:
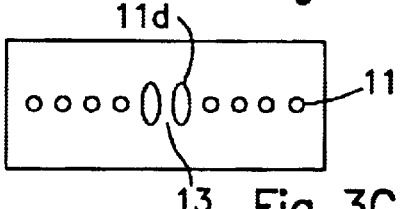

FIGS. 3A through 3C show various combinations of round injection holes 11 and elongated injection holes 11d. Elongated injection hole cross sections have the advantage over round cross-sectional shapes in that they have a higher flow coefficient, i.e., flow is less disturbed in comparison with round injection holes. Therefore, friction losses and turbulence losses may be reduced and consequently the system pressure may also be reduced.

FIG. 3A shows a combination of round injection holes 11 and elongated injection holes 11d, the round injection holes 11 being in the same plane with the spray ends of elongated injection holes 11d. Elongated injection holes 11d are arranged at the right and left of spark plug gap 13.

FIG. 3B shows elongated injection holes 11d which are also inclined with respect to one another by a freely selectable angle, amounting to approx. 45° in the present example.

As shown in FIG. 3C, round injection holes 11 may also be in a plane with the center points of elongated injection holes 11d. In all three cases, a relatively homogeneous mixture cloud may be produced, the injection quantity being influenceable by the size of injection holes 11, 11d.

Like FIGS. 3A and 3C, FIG. 4 shows two injection hole arrangements where only elongated injection holes 11d are provided in valve body 10.

Figures 1, 4A:
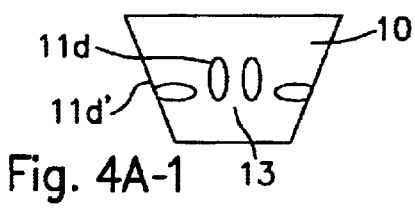
FIG. 4A is a first illustration of a third group of embodiments of the design of the valve body of the fuel injector according to the present invention.
Figure 4A:
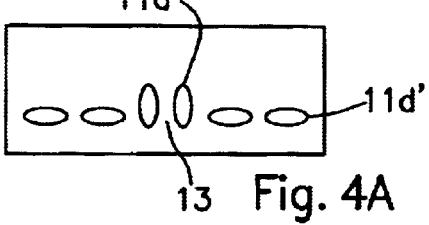
Figures 1, 4B:
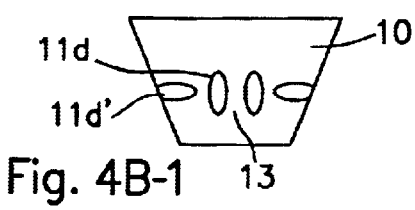
FIG. 4B is a second illustration of a third group of embodiments of the design of the valve body of the fuel injector according to the present invention.
Figure 4B:
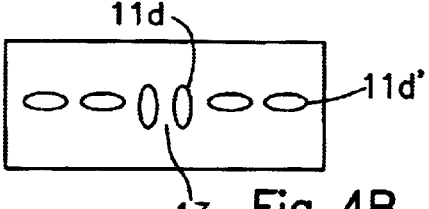

FIG. 4A shows elongated injection holes 11d arranged as in FIG. 3A, so that elongated injection holes 11d ordering spark plug 3, with their spray ends in the same plane with the other elongated injection holes 11d' arranged peripherally on valve body 10 and tilted in their extent by 90° to injection holes 11d at spark plug gap 13. FIG. 4B shows elongated injection holes 11d' situated peripherally in one plane with the center points of elongated injection holes 11d surrounding spark plug 3.

The arrangements of elongated injection holes 11d, 11d' shown in FIGS. 4A and 4B have the advantage that the manufacturing cost is lower because fewer injection holes 1d, 11d' need be provided in valve body 10. A very homogeneous distribution of fuel during injection is guaranteed by the fact that the periphery of valve body 10 is mostly covered with elongated injection holes 11d'.

FIG. 5 shows two embodiments of an arrangement of elongated injection holes 11e at a tilted angle in comparison with elongated injection holes 11d near spark plug 3.

Figures 1, 5A:
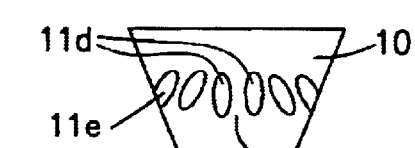
FIG. 5A is a first illustration of a fourth group of embodiments of the design of the valve body of the fuel injector according to the present invention.
Figure 5A:
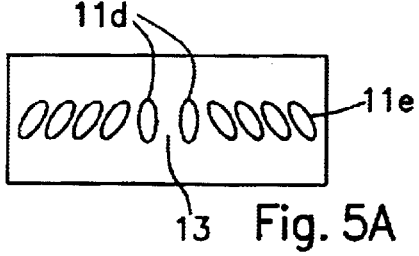

FIG. 5A shows elongated injection holes 11e with their upper inlet ends inclined in the direction of elongated injection holes 11d near spark plug 3. The inclination of elongated injection holes 11e is configured so that inclined injection holes 11e have at least one parallel main axis. A slight overlapping of the injection jets of the individual injection holes 11e may be achieved by additional inclination of elongated injection holes 11e, thus further improving the homogeneity of the mixture cloud.

Figures 1, 5B:
FIG. 5B is a second illustration of a fourth group of embodiments of the design of the valve body of the fuel injector according to the present invention.
Figure 5B:
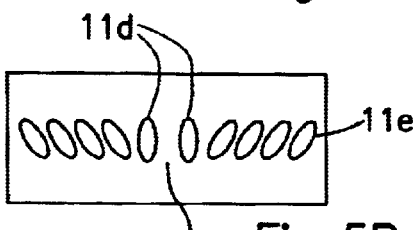

FIG. 5B shows an arrangement similar to that in FIG. 5A, but elongated injection holes 11e are now inclined in the opposite direction, i.e., the upper inlet ends of elongated injection holes 11e are inclined away from elongated injection holes 11d near spark plug 3. A slight overlapping is also possible here.

The present invention is not limited to the embodiments presented here and it can also be applied to fuel injectors 4 having fewer or more injection holes 11, for example. Likewise, elongated injection holes 11 may also be situated on more than one rows to thereby improve the homogeneity of the fuel-air mixture. The elongated design of injection holes 11 is also not limited to an optimum elliptical shape. The cross-sectional shapes may also be rectangular or oval.

What is claimed is:

1. A fuel injection system for an internal combustion engine, comprising:
    a combustion chamber;
    a spark plug projecting into the combustion chamber; and
    at least one fuel injector for injecting a fuel into the combustion chamber, wherein:
        the at least one fuel injector includes a valve body having a plurality of injection holes situated on a circumference so that an at least approximately conical injection jet is produced in the combustion chamber, and
        at least those of the plurality of injection holes situated directly on both sides of the spark plug have an elongated cross-section.

2. The fuel injection system according to claim 1, wherein:
    center points of those of the plurality of injection holes having the elongated cross-section are aligned with remaining ones of the plurality of injection holes.

3. The fuel injection system according to claim 1, wherein:
    ends of those of the plurality of injection holes having the elongated cross-section are aligned with remaining ones of the plurality of injection holes.

4. The fuel injection system according to claim 1, wherein:
    each one of the plurality of injection holes has the elongated cross section.

5. The fuel injection system according to claim 2, wherein:
    those of the plurality of injection holes situated in an immediate proximity of the spark plug are tilted by a predefined angle relative to remaining ones of the plurality of injection holes.

6. The fuel injection system according to claim 4, wherein:
    those of the plurality of injection holes situated in an immediate proximity of the spark plug have an axially parallel orientation that is different from an orientation of remaining ones of the plurality of injection holes.

7. The fuel injection system according to claim 6, wherein:
    the remaining ones of the plurality of injection holes are tilted at a 90° angle relative to the axially parallel orientation of those of the plurality of injection holes situated in the immediate proximity of the spark plug.

8. The fuel injection system according to claim 6, wherein:
    the remaining ones of the plurality of injection holes have an inclination and are situated so that one of their main axes is parallel.

9. A fuel injection system for an internal combustion engine, comprising:
    a combustion chamber;
    a spark plug projecting into the combustion chamber; and
    at least one fuel injector for injecting a fuel into the combustion chamber, wherein:
        the at least one fuel injector includes a valve body having a plurality of injection holes situated on a circumference so that an at least approximately conical injection jet is produced in the combustion chamber,
        at least those of the plurality of injection holes situated directly on both sides of the spark plug are positioned in a row that is offset relative to a row of remaining ones of the plurality of injection holes, and
        two of the plurality of injection holes on each of the both sides of the spark plug are situated in a stepped pattern in two planes that are offset relative to the row of the remaining ones of the plurality of injection holes.

* * * * *

UNITED STATES PATENT AND TRADEMARK OFFICE
CERTIFICATE OF CORRECTION

PATENT NO. : 6,644,267 B2
DATED : November 11, 2003
INVENTOR(S) : Gernot Wuerfel It is certified that error appears in the above-identified patent and that said Letters Patent is hereby corrected as shown below:

Column 4,
Line 50, change "1$d$, 11$d$'" to -- 11$d$, 11$d$' --

Signed and Sealed this

Tenth Day of August, 2004

JON W. DUDAS
*Acting Director of the United States Patent and Trademark Office*